United States Patent
Nonomura et al.

(10) Patent No.: US 7,061,544 B1
(45) Date of Patent: Jun. 13, 2006

(54) DIGITAL TELEVISION RECEIVER FOR RECEIVING A DIGITAL TELEVISION BROADCAST SIGNAL AND SIMULTANEOUSLY DISPLAYING A VIDEO PICTURE AND INFORMATION CONTAINED THEREIN

(75) Inventors: Takaya Nonomura, Higashiosaka (JP); Motoaki Asao, Higashiosaka (JP); Masako Wakisaka, Osaka (JP); Kiyoshi Awano, Hirakata (JP); Tadashi Shiono, Osaka (JP); Yoshinori Hama, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/355,990

(22) PCT Filed: Feb. 25, 1998

(86) PCT No.: PCT/JP98/00761

§ 371 (c)(1),
(2), (4) Date: Aug. 24, 1999

(87) PCT Pub. No.: WO98/38796

PCT Pub. Date: Sep. 3, 1998

(30) Foreign Application Priority Data

Feb. 25, 1997 (JP) .................................. 9-040635

(51) Int. Cl.
*H04N 7/08* (2006.01)
*H04N 5/445* (2006.01)

(52) U.S. Cl. ...................... 348/568; 348/563; 348/564; 348/465; 348/468; 725/39; 725/40

(58) Field of Classification Search ................ 348/568, 348/563, 564, 565, 569, 473, 465, 468, 460, 348/461, 705, 706, 907; 725/137, 39, 40, 725/42, 43, 49, 58; 345/716, 718, 719
See application file for complete search history.

(56) References Cited

U.S. PATENT DOCUMENTS 5,103,295 A * 4/1992 Uwabata et al. ............ 348/556

(Continued)

FOREIGN PATENT DOCUMENTS

JP 57-36068 8/1955

(Continued)

*Primary Examiner*—John Miller
*Assistant Examiner*—Jean W. Désir
(74) *Attorney, Agent, or Firm*—Arent Fox PLLC

(57) ABSTRACT

A digital television receiver includes a CS receive circuit (12). This CS receive circuit receives a digital television broadcast signal. The digital television broadcast signal contains video data from which first video data is created as well as EPG data from which second video data is created. First and second video compression circuits (18, 20) respectively compress first and second video data and output first and second compression video signals. The first and second compression video signals are composited together by a video compositing circuit (22). Consequently, on the monitor (24) are displayed EPG and broadcast video picture in a 2-screens form.

11 Claims, 12 Drawing Sheets

U.S. PATENT DOCUMENTS

| | | | | |
|---|---|---|---|---|
| 5,109,279 | A | * | 4/1992 | Ando .......................... 348/564 |
| 5,434,625 | A | * | 7/1995 | Willis ......................... 348/564 |
| 5,504,535 | A | * | 4/1996 | Abe ............................ 348/565 |
| 5,557,338 | A | * | 9/1996 | Maze et al. .................... 725/38 |
| 5,576,769 | A | * | 11/1996 | Lendaro ..................... 348/511 |
| 5,596,373 | A | * | 1/1997 | White et al. ................ 348/569 |
| 5,598,222 | A | * | 1/1997 | Lane .......................... 348/568 |
| 5,671,019 | A | * | 9/1997 | Isoe et al. ................... 348/565 |
| 5,680,177 | A | * | 10/1997 | Abe ............................ 348/564 |
| 5,734,436 | A | * | 3/1998 | Abe et al. ................... 348/564 |
| 5,790,204 | A | * | 8/1998 | Yamaguchi ................ 348/564 |
| 5,850,218 | A | * | 12/1998 | LaJoie et al. ................ 725/45 |
| 5,875,000 | A | * | 2/1999 | Yamaguchi ................ 348/563 |
| 5,969,769 | A | * | 10/1999 | Hamadate ................... 348/568 |
| 6,249,547 | B1 | * | 6/2001 | Boyce et al. ........... 375/240.15 |
| 6,477,705 | B1 | * | 11/2002 | Yuen et al. ................... 725/41 |
| 6,519,009 | B1 | * | 2/2003 | Hanaya et al. .............. 348/564 |

FOREIGN PATENT DOCUMENTS

| | | |
|---|---|---|
| JP | 57-36068 | 2/1982 |
| JP | 61-375 | 6/1986 |
| JP | 02-054688 | 2/1990 |
| JP | 5-252492 | 9/1993 |
| JP | 8-116499 | 5/1996 |
| JP | 08-237563 | 9/1996 |
| JP | 08-242413 | 9/1996 |
| JP | 08-322000 | 12/1996 |

* cited by examiner

FIG. 16

| CASE | CONTROL | 1ST COMPRESSION INPUT | 2ND COMPRESSION INPUT | 1ST COMPRESSION RATIO | 2ND COMPRESSION RATIO | VIDEO COMPOSITION SWITCH WINDOW | CS USUAL OUTPUT SWITCH WINDOW |
|---|---|---|---|---|---|---|---|
| CASE 1 | CS VIDEO / OTHER VIDEO | CS VIDEO | ANOTHER VIDEO | 50 % | 50 % | 1ST COMPRESSION ON VIDEO / 2ND COMPRESSION ON VIDEO | BROADCAST VIDEO |
| CASE 2 | CS VIDEO/EPG / OTHER VIDEO | CS VIDEO | ANOTHER VIDEO | 50 % | 50 % | 1ST COMPRESSION ON VIDEO / 2ND COMPRESSION ON VIDEO | BROADCAST VIDEO / EPG |
| CASE 3 | CS VIDEO | Don't care | CS VIDEO | Don't care | 100 % | 2ND COMPRESSION VIDEO | BROADCAST VIDEO |
| CASE 4 | EPG / CS VIDEO | CS EPG OUTPUT | CS VIDEO | 50 % | 50 % | 2ND COMPRESSION VIDEO | BROADCAST VIDEO + EPG |
| CASE 5 | CS VIDEO / EPG | Don't care | CS VIDEO | Don't care | 100 % | 2ND COMPRESSION VIDEO | BROADCAST VIDEO / EPG |

DIGITAL TELEVISION RECEIVER FOR RECEIVING A DIGITAL TELEVISION BROADCAST SIGNAL AND SIMULTANEOUSLY DISPLAYING A VIDEO PICTURE AND INFORMATION CONTAINED THEREIN

TECHNICAL FIELD

This invention relates to digital television receivers and, more particularly, to a digital television receiver which displays at a same time on a display a video picture and letter information that are contained in a digital television broadcast signal.

PRIOR ART

In digital television broadcast, many programs have being broadcast over various channels with characteristics thereof reflected. In the digital television broadcasts, it is a usual practice to broadcast a program by adding program guide data to video data in order to facilitate program choice by the user. For this reason, the conventional digital television receiver of this kind is provided with a program guide display key on an accessory remote control. If the display key is pressed, a program guide will appear to be superimposed over a televised video picture, as shown in FIG. 1. It is therefore possible for a user to easily choose a desired program with using such a program guide.

However, in the conventional art with superimposition of display as in FIG. 1 there has been a problem that a broadcast video picture is to be blanked off in most part thereof by a program guide.

SUMMARY OF THE INVENTION

It is therefore a primary object of the present invention to provide a novel digital television receiver.

It is another object of the present invention to provide a television receiver which has a televised video picture that is not prevented by a program guide.

A digital television receiver according to the present invention, comprises: a receive means for receiving a digital television broadcast signal; a first output means for outputting a first video signal based on a video signal contained in a digital television broadcast received by the receive means; a second output means for outputting a second video signal based on an additional information signal contained in the digital television broadcast signal received by the receive means; a first compression means for compressing a first video signal and outputting a first compression video signal; a second compression means for compressing the second video signal and outputting a second compression video signal; and a compositing means for compositing, and outputting onto monitor, the first compression video signal and the second compression video signal so as to be displayed on different screen portions of the monitor.

The first video signal is compressed by the first compression means, and the second video signal is by the second compression means. The compositing means composites, and outputs onto the monitor, the first compressed video signal and the second compressed video signal. Due to this, a broadcast video picture and additional information, say EPG, are simultaneously displayed, for example, in 2-screens display form on the monitor.

In one aspect of the present invention, a digital television receiver further comprising: a display control key; a disable means for disabling the first compression means depending upon operation of the display control key and outputting an uncompressed first video signal from the first compression means; and a control means for controlling to output from the compositing means only the first video signal given from the first compression means.

In this aspect, if a user manipulates the display control key provided on the remote control transmitter, the disable means disables the first compression means so that an uncompressed video signal is outputted from the first compression means. Also, the control means controls the compositing means to output only an uncompressed video signal from the output means. Accordingly, only a broadcast video is displayed on the monitor.

According to the present invention, because a broadcast video and additional information are simultaneously displayed on different screen portions of the display, there is no obstruction to a video picture by an additional information. Incidentally, when additional information is unnecessary, only a video picture can be displayed on the monitor by operating the display control key.

In an embodiment of the present invention, a digital television receiver, comprises: a receive means (12, 121) for receiving a digital television broadcast signal; a first extraction means (123, 124) for extracting broadcast video data contained in a digital television broadcast signal received by the receive means; a second extraction means (123) for extracting additional information data contained in the digital television broadcast signal received by the receive means; an additional information video data output means (126, 127) for outputting additional information video data based on the additional information data; a first video compositing means (125) for compositing the broadcast video data and the additional information video data according to a first window signal and outputting digital video data; a first selector (36) for receiving at least the digital video data and the additional information video data and outputting first video data; a second selector (38) for receiving at least the digital video data and the additional information video data and outputting second video data; a first video compression means (40) for compressing the first video data according to a first compression ratio and outputting a first compression video signal; a second video compression means (42) for compressing the second video data according to a second compression ratio and outputting a second compression video signal; a second video compositing means (44) for compositing the first compression video signal and second compression video signal according to a second window signal; and a monitor (24) for displaying video pictures based upon an output of the second video compositing means.

In an embodiment, a digital television receiver further comprises an input means (30) to be operated by a user and a window change means (126, 128, 26, 46) to change at least one of the first window signal and the second window signal depending upon operation of the input means.

Also, in an embodiment, a digital television receiver further comprises a compression ratio control means (26) to control the first compression ratio and the second compression ratio depending upon operation the input means.

According to this embodiment, it is possible to display a digital television broadcast video picture and additional information, for example, in a 2-screens form or superimposition by properly controlling the first window signal and/or second window signal and the first compression ratio and/or second compression ratio.

Furthermore, if another of video data is supplied to the first selector and second selector, it is possible to display in an arbitrary form a digital television broadcast video picture, additional information and other pictures on the monitor.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is an illustrative view showing a control content and display state in each of cases 1–5 in the FIG. 15 embodiment.

BEST FORM FOR PRACTICING THE INVENTION

Figure 2:
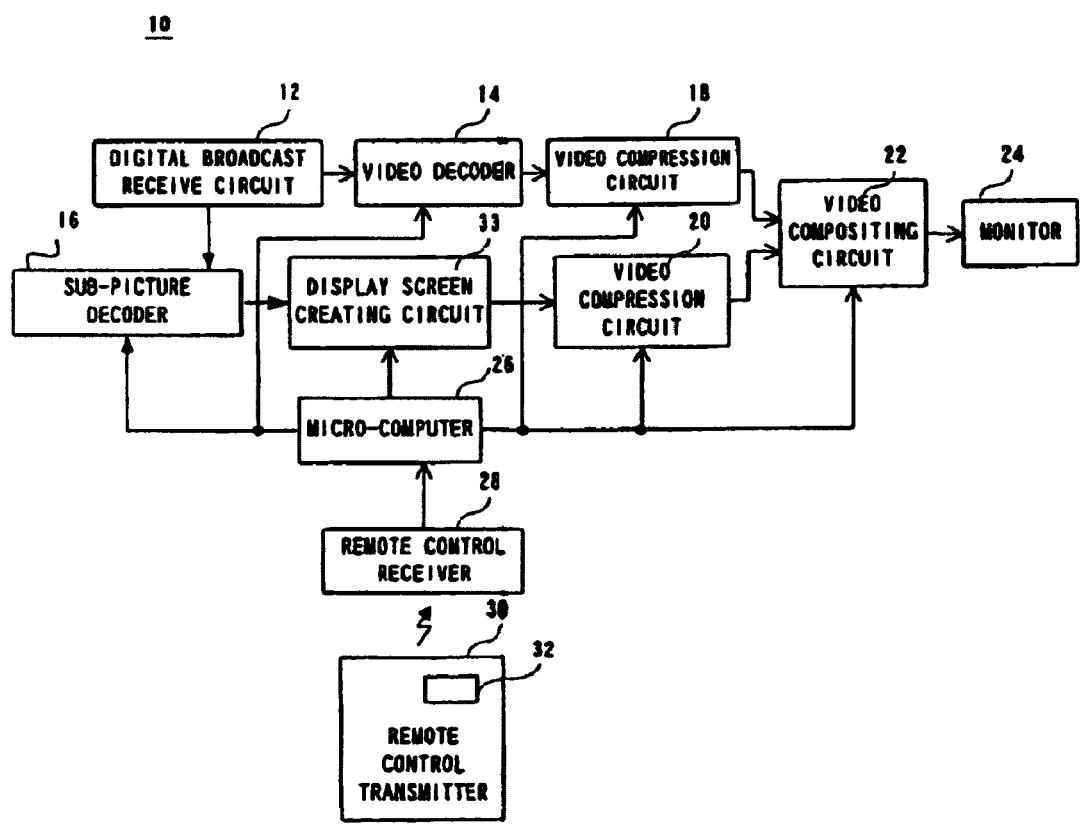
FIG. 2 is a block diagram showing one embodiment of the present invention.

Referring to FIG. 2, a television receiver 10 in this embodiment includes a digital broadcast receive circuit 12. The digital broadcast receive circuit 12 detects coded video data and sub-picture data that are contained in digital broadcast data received, and outputs video data to an video decoder 14 and sub-picture data to a sub-picture decoder 16. The video decoder 14 decodes input video data and D/A-converts it into an analog video signal to be supplied to an video compression circuit 18. The sub-picture decoder 16 also decodes the sub-picture data and converts it into an analog sub-picture signal to be supplied to a display screen creating circuit 33. The display screen creating circuit 33 composites a predetermined display screen signal with the sub-picture signal, thereby creating an additional information signal, e.g. program guide signal. Incidentally, the sub-picture signal includes, besides a letter information signal, a bit map signal and rendering signal (line, square, etc).

The video compression circuits 18 and 20 are enabled and disabled in accordance with a control signal sent from a micro-computer 26. That is, the video compression circuits 18 and 20, if receiving an enable signal, compresses an video signal and additional information signal to ½. If a disable signal is given, they output a video signal and additional information signal without compressing them. When the video and positional information signals are compressed, an video compositing circuit 22 composites the compressed video and additional information signals in accordance with a control signal sent from the micro-computer 26, thus outputting a composite signal onto a monitor 24. On the other hand, if for example the video compression circuit 18 is disabled, the video compositing circuit 22 is given an uncompressed video signal so that the video compositing circuit 22 outputs only the video signal to the monitor 24 according to a control signal sent from the micro-computer 26.

Figure 3:
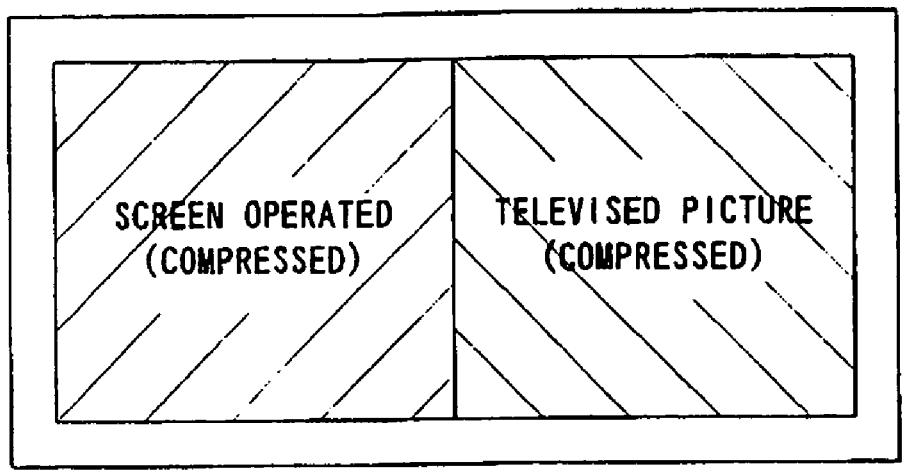
FIG. 3 is an illustrative view showing a picture displayed on a monitor.
Figure 4:
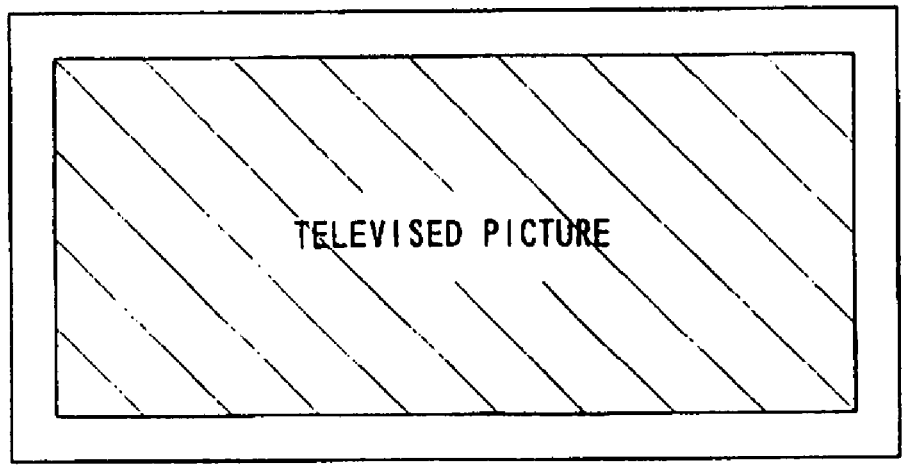
FIG. 4 is an illustrative view showing a picture displayed on the monitor.

Due to this, when a composite signal is outputted from the video compositing circuit 22, a program guide (additional information) and broadcast video are simultaneously displayed in a form of 2 screens on the monitor 24, as shown in FIG. 3. On the other hand, when only an video signal is outputted from the video compositing circuit 22, a broadcast video is displayed entirely on the monitor 24, as shown in FIG. 4.

Figure 5:
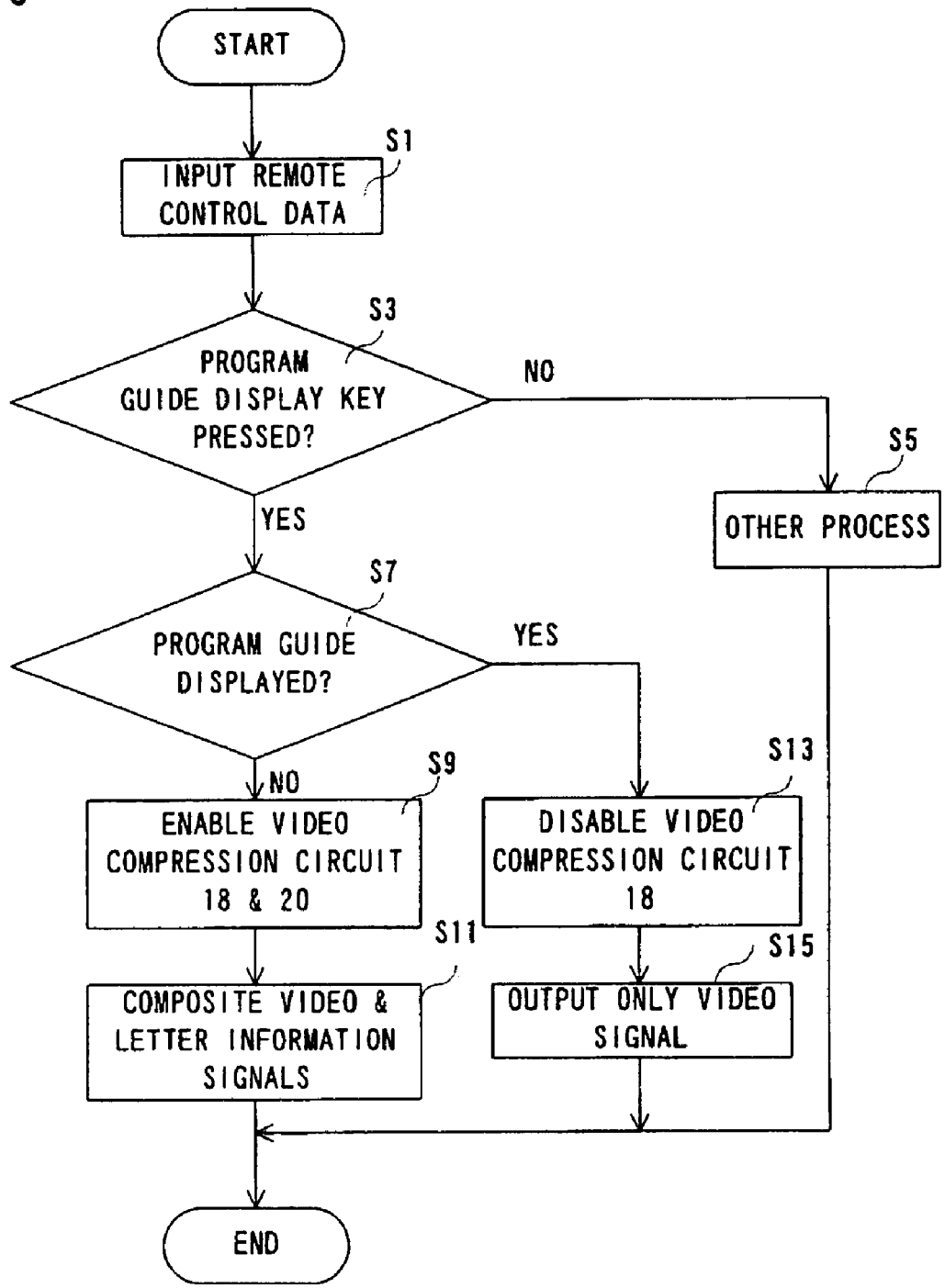
FIG. 5 is a flowchart showing one part of operation in the FIG. 2 embodiment.

The micro-computer 26 receives remote control data from a receiver 28 which receives an infrared ray signal sent from the remote control 30, and processes a flowchart shown in FIG. 5.

That is, remote control data is received in the first step S1, and in step S3 it is determined from the remote control data whether or not depressed was the program guide display key 32 on the remote control transmitter 30. If "NO", other process is performed in step S5. However if "YES", it is determined in step S7 whether a program guide (EPG) is being displayed at the present time on the monitor 24 or not.

If no program guide is being displayed, then in step S9 an enable signal is delivered to the video compression circuits 18 and 20 to compress the video and letter information signals to ½. Thereafter, the video compositing circuit 22 is controlled to composite between the compressed video and additional information signals. On the other hand, if a program guide is being displayed is determined in step S7, the video compression circuit 18 is disabled in step S13, and the video compositing circuit 22 is controlled in step S15 to output only a video signal.

In this manner, the video compression circuits 18 and 20 respectively compress down to ½ the video signal and the additional information signal outputted from the video decoder 14 and the sub-picture decoder 16. Accordingly, on the monitor 24 a broadcast video and additional information are displayed in a parallel 2-screens form. Consequently, retrieving or scheduling for a next program is possible without preventing a broadcast video from viewing. Also, because the additional information, or program guide, can be handled while watching a broadcast video, it is possible to perform operation in a manner matched to progression of an airing program.

Figure 6:
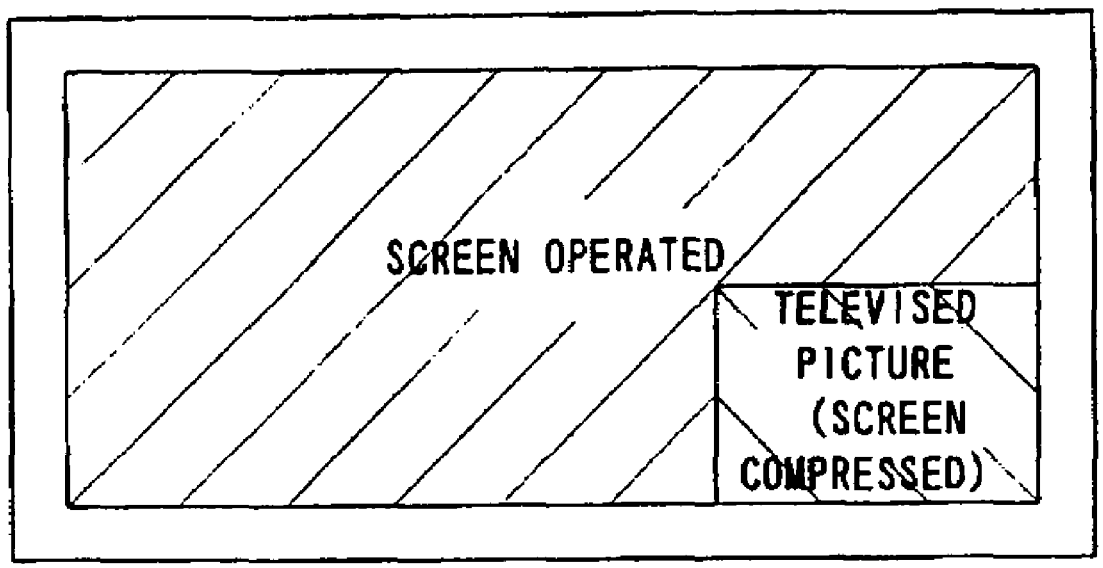
FIG. 6 is an illustrative view showing a picture displayed on the monitor.

Incidentally, in this embodiment where displaying a broadcast video and a program guide together, the video compression circuits 18 and 20 were set in a compression ratio of 1/2. However, if the compression ratio of the video compression circuit 18 is increased and the compression ratio of the video compression circuit 20 is decreased to zero, a broadcast video and program guide will be displayed on the monitor 24 as shown in FIG. 6. In this case, the program guide operationality can be improved without disturbing an airing video due to a program guide.

Also, if a step is provided as a subroutine for the step S11 to switch the timing of compositing video and additional information signals according to an instruction sent from a user, it is possible to switch left and right the position of displaying a broadcast video and operation screen.

Incidentally, the additional information includes, besides program guides, television shopping and voting information, mail information sent from a broadcast center, etc. These of information may be displayed on the monitor 24 by operating a predetermined key.

Figure 1:
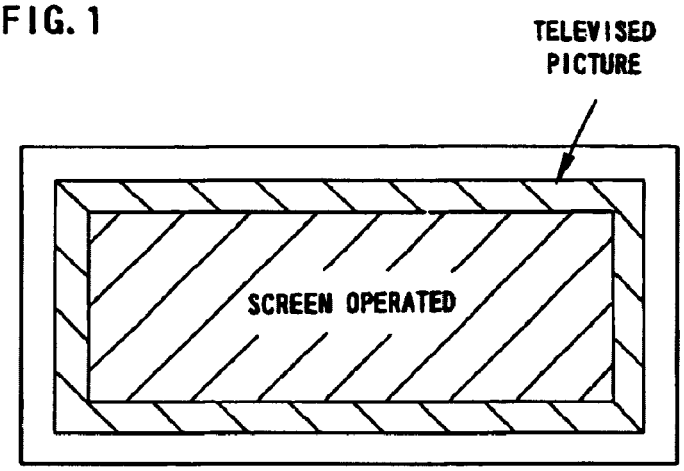
FIG. 1 is an illustrative view showing a program display state in a prior art.
Figure 7:
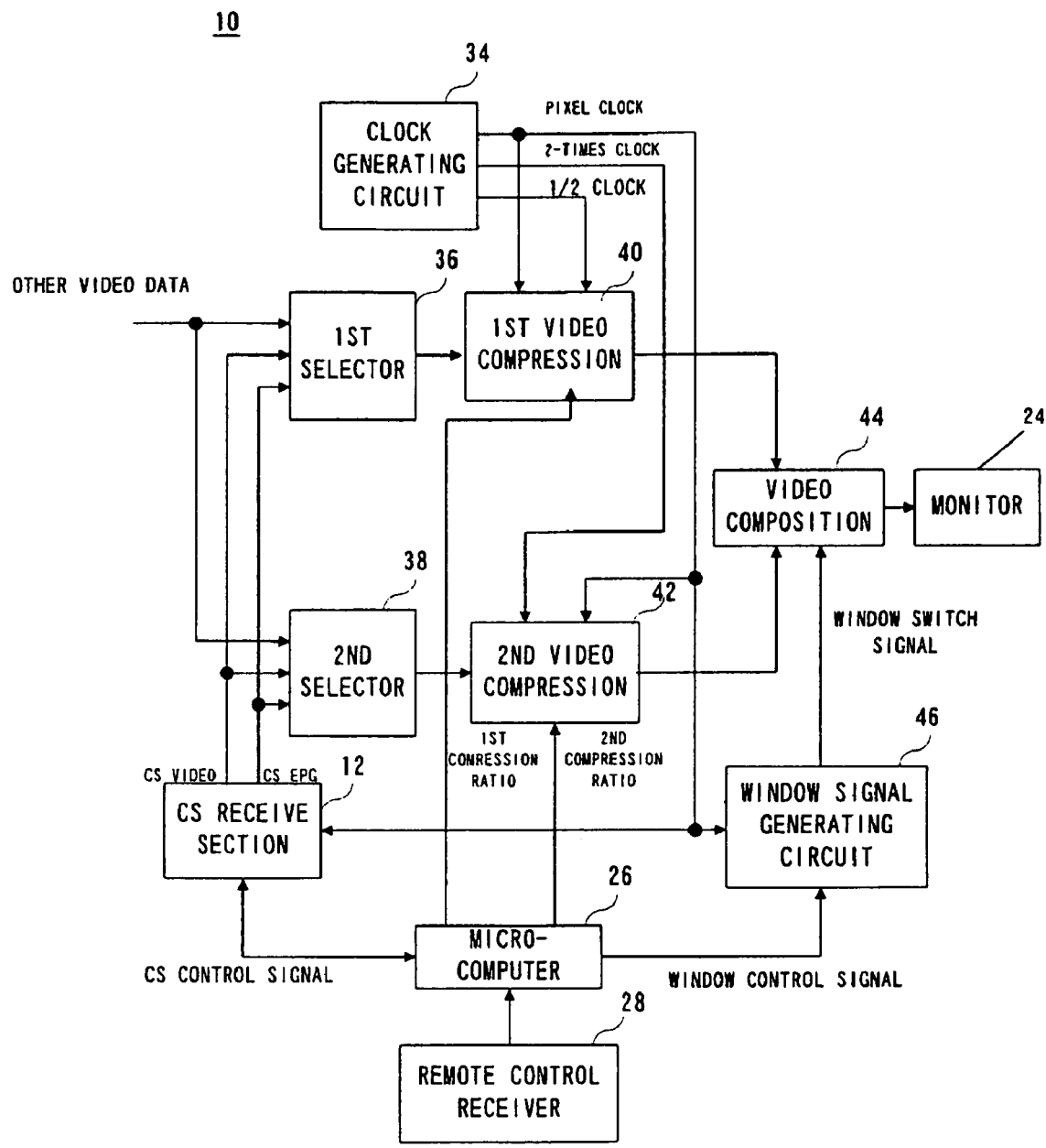
FIG. 7 is a block diagram showing another embodiment of the present invention.
Figure 8:
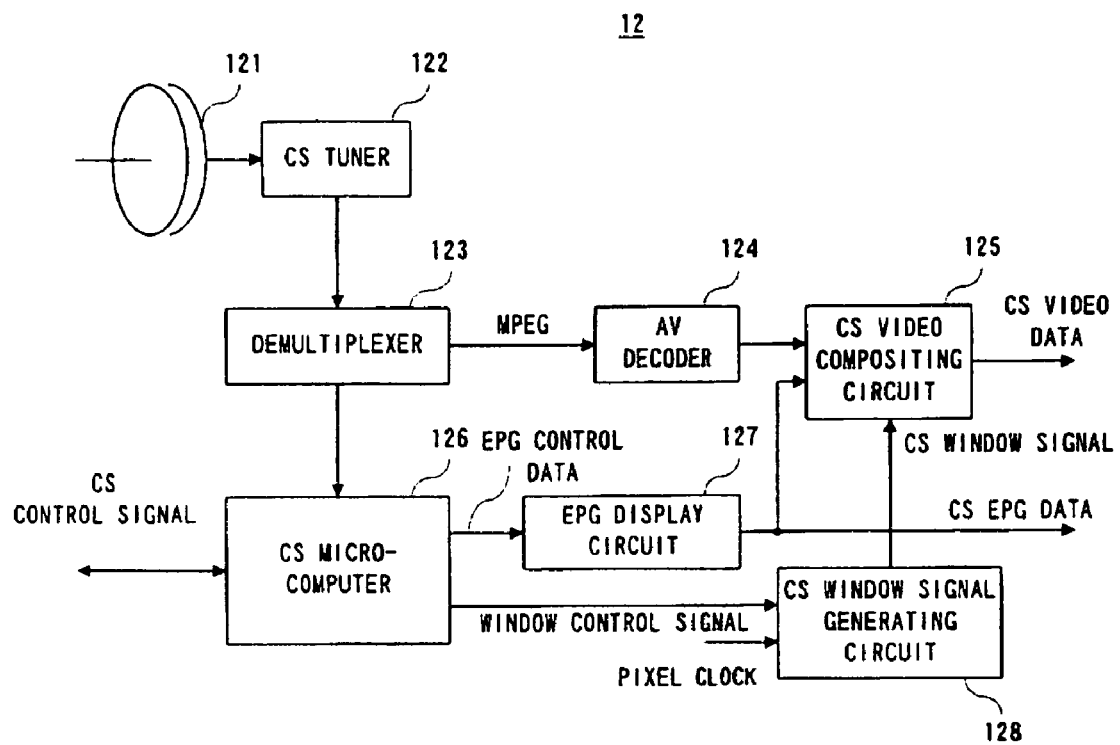
FIG. 8 is a block diagram showing a CS receive section in the FIG. 7 embodiment.

Referring to FIG. 7, a television receiver 10 according to another embodiment of the present invention includes a CS receive section 12 that is similar to that of the digital broadcast receive circuit 12 of the FIG. 1 embodiment. This CS receive section 12 includes, as shown in FIG. 8, a CS antenna 121. It should be previously noted that in FIG. 7 audio data and audio signal paths are omittedly shown.

The CS antenna 121 receives a CS television broadcast radio wave that is inputted to a CS tuner 122 where a desired digital broadcast signal is selected and then sent to a demultiplexer 123. The demultiplexer 123 separates program guide (Electric Program Guide: EPG) data and MPEG data from the digital broadcast signal, and supplies the MPEG data to an AV decoder 124. The AV decoder 124 outputs NTSC-formatted video data according to MPEG data sent from the demultiplexer 123. The NTSC video data is supplied to a CS video compositing circuit 125.

On the other hand, the EPG data outputted from the multiplexer 123 is supplied to a CS micro-computer 126. The CS micro-computer 126 cumulates EPG data to an amount, for example, of 200 channels for 1 week within a memory attached (not shown). The CS micro-computer 126 extracts EPG data required for display, for example, in amount of 3 channels and for 3 hours from the accumulated EPG data, and supplies control data (including, e.g. font data and rendering data) required to display the extracted EPG data to an EPG display circuit 127. The EPG display circuit 127 includes a font generator and rendering device, and creates NTSC video data to display 3-channels, 3-hours EPG according to EPG control data sent from the CS micro-computer 126. The EPG video data is delivered to the CS video compositing circuit 125, and also outputted as CSEPG data to other circuits of the television receiver 10, e.g. a first selector 36 and second selector 38 (FIG. 7).

The CS micro-computer 127 receives a CS control signal from a system control micro-computer 26 of the television receiver 10 shown in FIG. 7, and outputs a window control signal based on that signal. The CS control signal sent from the system control micro-computer 26 includes, for example, a status signal representative of in what state the television receiver 10 is presently situated, remote control data, etc. Incidentally, a status signal is delivered as a CS control signal from the CS micro-computer 126 to the system control micro-computer 26, which represents, for example, whether EPG is displayed in 1-screen or 2-screens form.

A CS window signal generating circuit 128 supplies a CS window signal to the CS video compositing circuit 125, based on a pixel clock sent from a clock generating circuit 34 included in the television receiver 10 of FIG. 7 as well as on a window control signal mentioned before. The CS window signal is used only to output CS video (first video) and EPG (second video) data through superimposition from the CS video compositing circuit 125, and representative of in what area or range of a first video picture a second video picture is to be superimposed over. Consequently, the CS video compositing circuit 125 outputs CS video data (including a CS broadcast video and EPG) to display EPG in a range specified by the CS window signal.

Referring back to FIG. 7, the television receiver 10 includes a first selector 36 and a second selector 38. The first selector 36 and the second selector 38 are respectively given CS video data and CSEPG data from the CS receive section 12. They are also given other video data, e.g. a terrestrial television broadcast, BS (Broadcasting Satellite) television broadcast or external video input. The first selector 36 and second selector 38 each select CS video data, CSEPG data or other video data according to a select instruction signal sent from the system control micro-computer 26. The first selector 36 has an output to be supplied to a first video compression circuit 42. The second selector 38 has an output to be supplied to a second video compression circuit 42.

Figure 9:
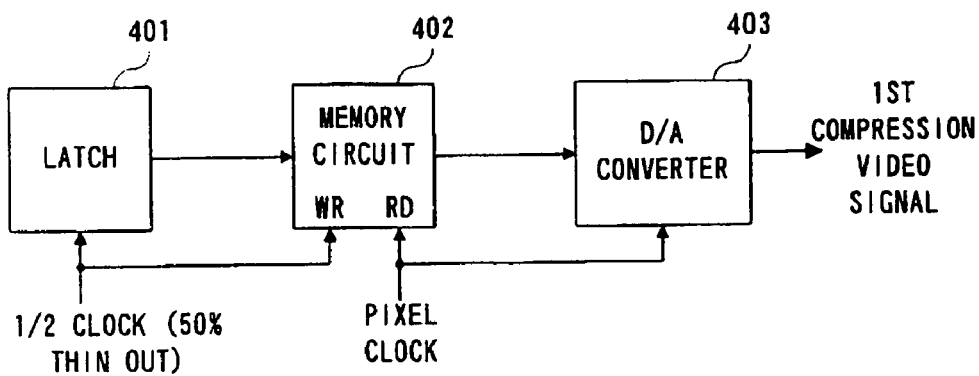
FIG. 9 is a block diagram showing a first video compression circuit in the FIG. 7 embodiment.

The first video compression circuit 40 includes, as shown in FIG. 9, a latch circuit 401 to receive as a latch signal a ½ clock (clock that is a half in frequency of the pixel clock) sent from the clock generating circuit 34 (FIG. 7), and further a memory circuit 402. The memory circuit 402 is given the above-mentioned ½ clock as a write clock and the pixel clock (clock in synchronism with a display pixel of the monitor 24) as a read clock. Consequently, the first video compression circuit 40 writes therein the data supplied from the first selector 36 at a rate of ½ clock and read it out at a rate of the pixel clock so that the video data given from the first selector 36 is thinned out to ½ thus being compressed and outputted. The output of the memory circuit 402 is outputted, as a first compression video signal, through a D/A converter 403.

Figure 10:
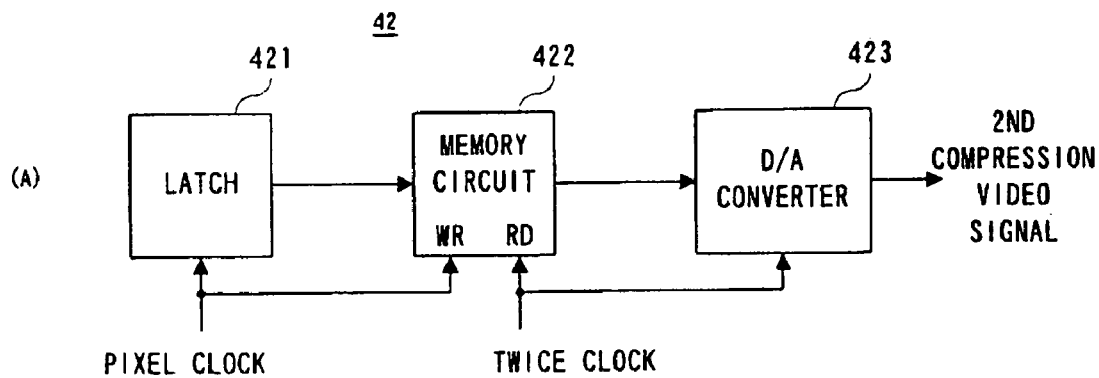
FIG. 10 is a block diagram showing a second video compression circuit in the FIG. 7 embodiment.
Figure 10:
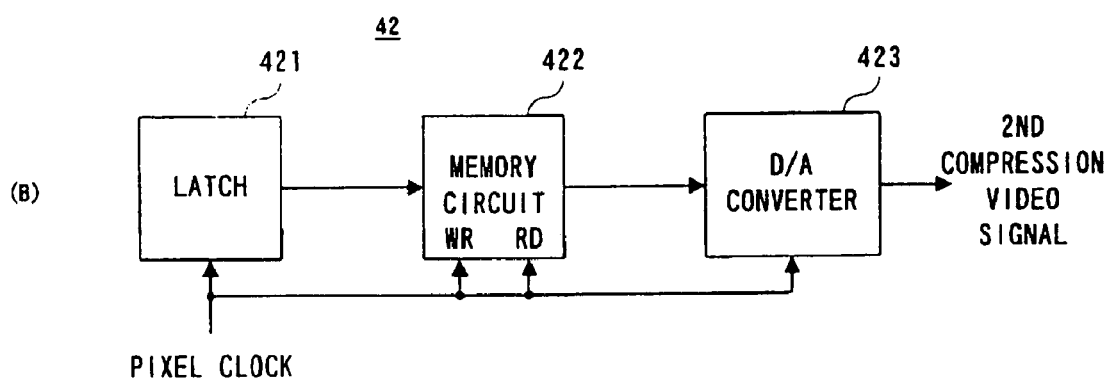

The second video compression circuit 42 includes, as shown in FIG. 10, a latch circuit 421 to receive, as latch signal, the pixel clock sent from the clock generating circuit 34 (FIG. 7), and further a memory circuit 422. The memory circuit 422 is given, as a write clock, the aforesaid pixel clock, and as read clock a twice clock (clock twice in frequency of the pixel clock from the clock generating circuit 34) or the pixel clock. Accordingly, the second video compression circuit 42 writes therein the data sent from the second selector 38 at a rate of the pixel clock, and read it out at a rate of the twice clock or pixel clock so that the data supplied from the second selector 38 is outputted with compression down to ½ or without compression. The output of the memory circuit 422 is outputted as a second compression video signal through a D/A converter 423.

Figure 11:
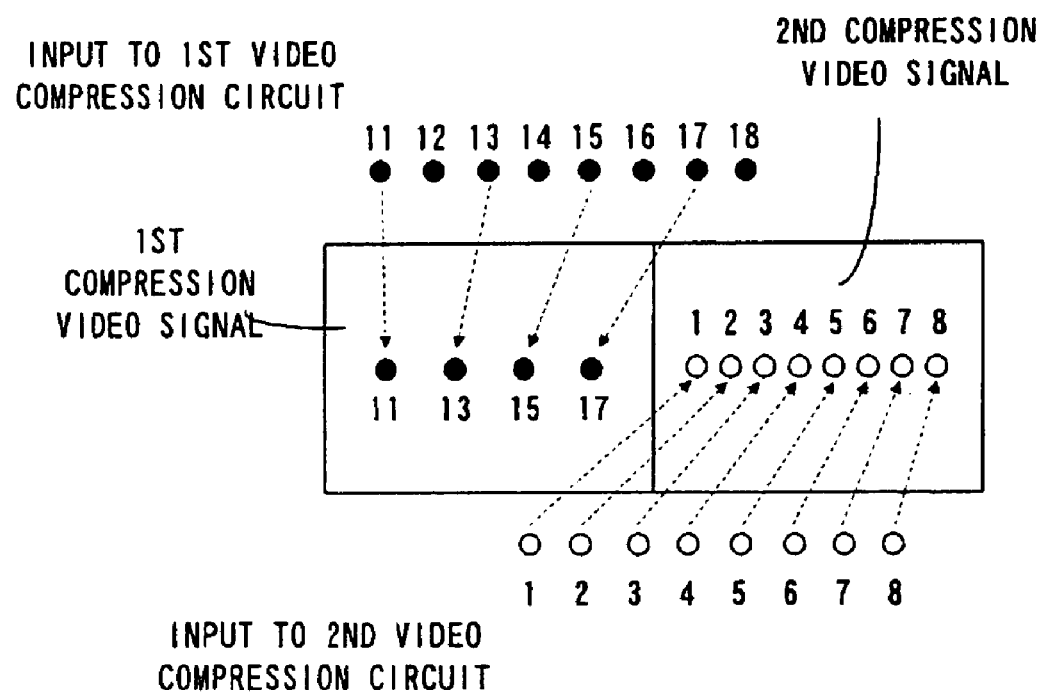
FIG. 11 is an illustrative view showing an operation in the first and second imge compression circuits.

Now, explanation will be made on the operation to compress a video down to ½ by the first video compression circuit 40 and the second video compression circuit 42, with reference to FIG. 11.

Incidentally, the first video compression circuit 40 is half in memory capacity of the second video compression circuit 42. Accordingly, the first video compression circuit 40 is half in resolution. This is for reducing cost while preventing the main video, e.g. EPG, from deteriorating in resolution. That is, the EPG displays letters and is impossible to be decreased in resolution, and accordingly the second video compression circuit 42 cannot be decreased in memory capacity. Nevertheless, there is requirement to reduce cost. Therefore, in this embodiment the first video compression circuit 40 is decreased in memory capacity by sacrificing in a certain degree the resolution of the main video, e.g. broadcast video, thereby satisfying both the requirements of resolution and cost reduction.

The first video compression circuit 40 is to write the video data given from the first selector 36 to the memory circuit

402 at a rate of ½ clock. Consequently, if it is assumed that the black dots in FIG. 11 "11", "12", "13", "14", "15", "16", "17", "18", . . . be inputted through the latch circuit 401, then black dots "11", "13", "15", "17", . . . will be written to the memory circuit 402. That is, the memory circuit 402 is written through thinning-out to ½ by the data sent from the latch circuit 401, i.e. the video data from the first selector 36. Because the memory circuit 402 uses a pixel clock as a read-out clock, black dots "11", "13", "15", "17", . . . are read out of the memory circuit 402 in response to the pixel clock. In this manner, output video data is obtained from the first video compression circuit 40 which has been compressed by thinning out the input video data down to ½.

The second video compression circuit 42 is to write the data given from the second selector 38 to the memory circuit 422 at the pixel clock. Accordingly, if it is assumed that the white dots in FIG. 11 "1", "2", "3", "4", "5", "6", "7", "8", . . . be inputted through the latch circuit 421, white dots "1", "2", "3", "4", "5", "6", "7", "8", . . . will be written to the memory circuit 422. That is, the memory circuit 422 is written by as it is the data given from the latch circuit 421, i.e. the data from the second selector 38. Because the memory circuit 422 in FIG. 10(A) has a twice clock as a read-out clock, white dots "1", "2", "3", "4", "5", "6", "7", "8", . . . are read out of the memory circuit 422 responsive to the twice clock. In this manner, output video data is obtained from the second video compression circuit 42 which has been compressed twice the input video data.

Incidentally, there is a case that the second video compression circuit 42 outputs input video data as it is without compression, as shown in FIG. 10(B). That is, where the input video data from the latch circuit 421 is written at a pixel clock rate to the memory circuit 422 and then read out at the pixel clock rate of the memory circuit 422, the second video compression circuit 42 does not function as a video compression circuit.

The respective first compression video signal and second compression video signal from the first video compression circuit 40 and second video compression circuit 42 are both supplied to the video compositing circuit 44. It should be noted that, although these first video compression circuit 40, second video compression circuit 42 and video compositing circuit 44 are similar to the video compression circuits 18 and 20 and video compositing circuit 22 of the FIG. 1 embodiment, in the FIG. 7 embodiment different reference numerals are employed. The video compositing circuit 44 has an output to be delivered to the monitor 24.

In the FIG. 7 embodiment, the television receiver 10 further includes a system control micro-computer 26. This system control micro-computer 26 supplies a CS control signal as mentioned before to the CS receive section 12, and a window control signal for video composition to a window signal generating section 46. Incidentally, the system control micro-computer 26 is given remote control data from the remote control receiver 28. The system control micro-computer 26 sends a first compression ratio signal and a second compression ratio signal, respectively, to the first video compression circuit 40 and the second video compression circuit 42. Receiving a first compression ratio signal, the first video compression circuit 40 carries out video compression with "thinning-out" as was explained before with reference to FIG. 11. The second video compression circuit 42 outputs a twice-compressed video signal or equi-times (uncompressed) video signal according to a second compression ratio signal.

Figure 12:
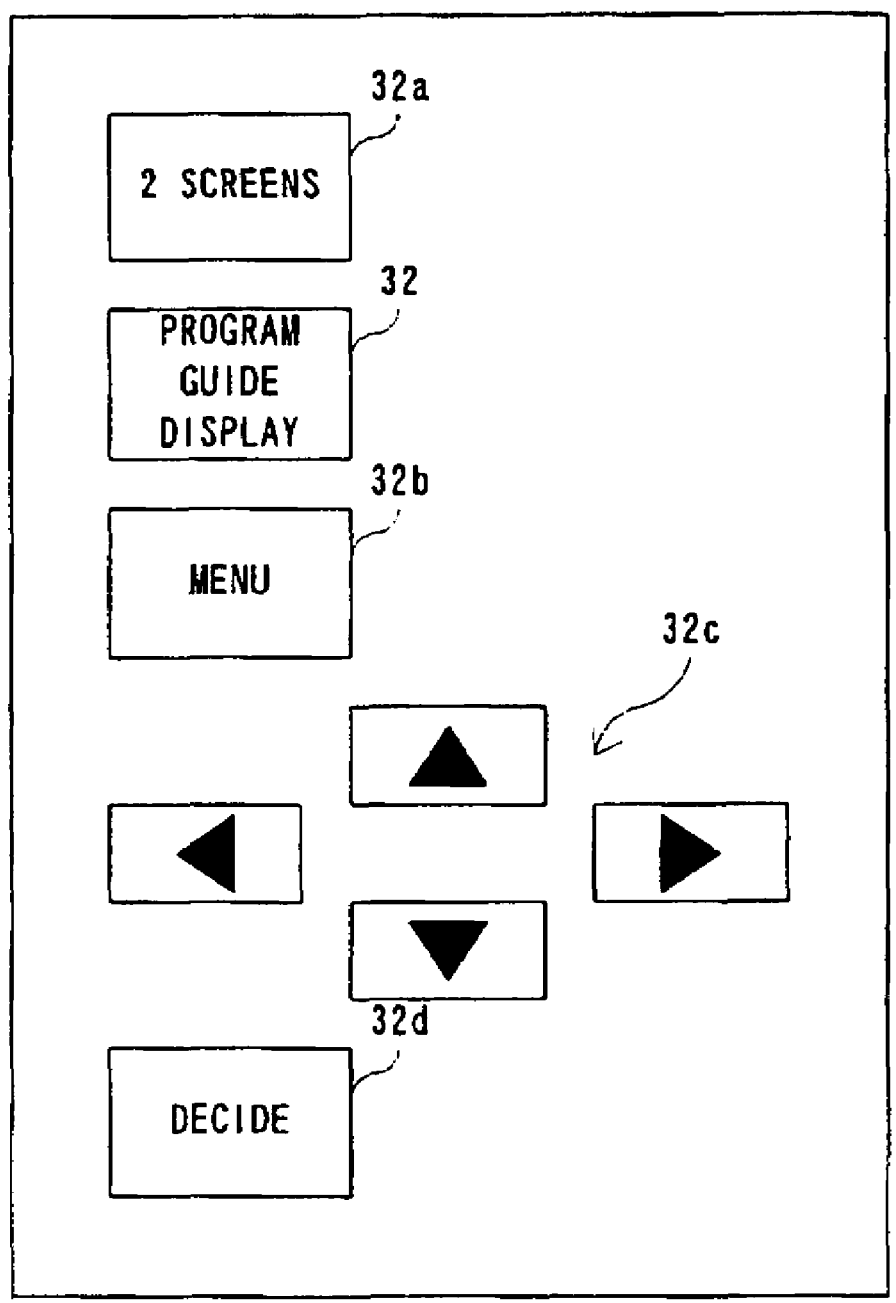
FIG. 12 is an illustrative view showing one example of key arrangement on a remote control transmitter.
Figure 13:
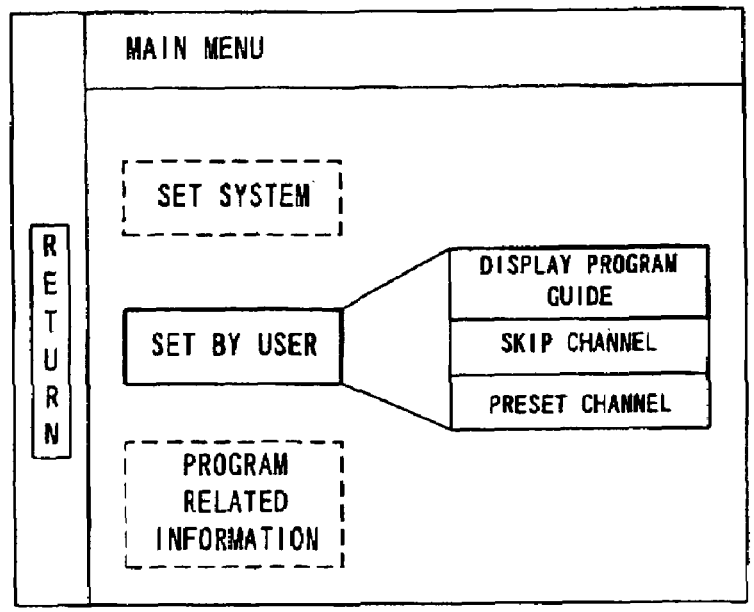
FIG. 13 is an illustrative view showing a main menu.
Figure 14:
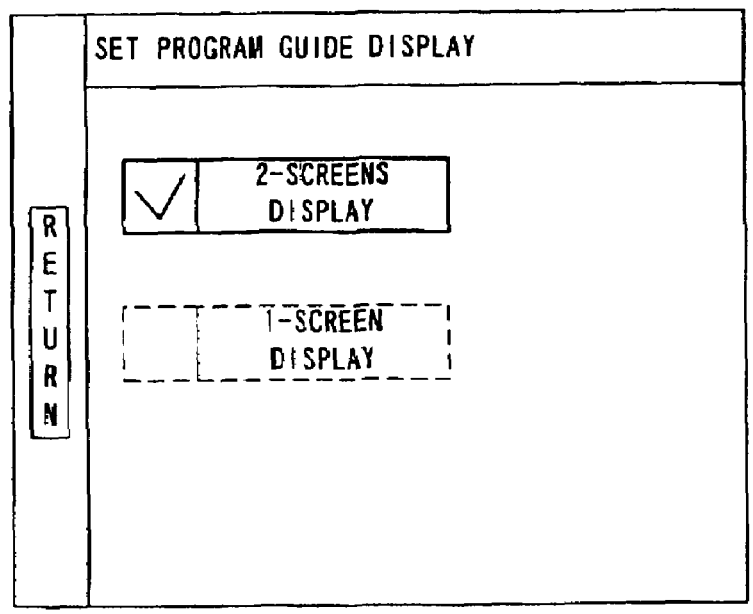
FIG. 14 is an illustrative view showing a setting menu to set whether to display a program guide on 1 screen or 2 screens.

Referring to FIG. 12, the remote control transmitter 30 includes a 2-screens key 32*a*, a program guide display key 32, a menu key 32*b*, a cursor move key 32*c* and a decide key 32*d*, in addition to a well-known power key, sound volume key and channel select key. The 2-screens key 32*a* is a toggle key. If this 2-screens key 32*a* is manipulated during displaying a video in 1 screen on the monitor 24, the monitor 24 is divided in screen left and right into two, thus allowing to display different videos on the respective divisional portions of the screen. The program guide display key 32 is to instruct whether to display a program guide (EPG) on the monitor 24 screen. The menu key 32*b* is to display a menu as shown in FIG. 13 or FIG. 14 on the monitor 24. The cursor move key 32*c* is to choose an option on a menu screen. The decide key 32*d* is to decide an opted menu item having been selected by the cursor move key 32*c*.

In FIG. 13 and FIG. 14, the block drawn by somewhat bold lines represents an item being opted by the cursor move key 32*c*. When the cursor is on an item "PROGRAM GUIDE DISPLAY" as shown in FIG. 13, if the cursor is moved to "RETURN" and the determine key 32*d* is pressed, then the present main menu is closed. However, if the determine key 32*d* is pressed with the cursor positioned as in FIG. 13, then displayed is a program guide set menu as shown in FIG. 14. The check mark in FIG. 14 represents that the current display is in a 2-screens display state. In the state of FIG. 14, if the cursor is moved to "RETURN" and the determine key 32*d* is pressed, this program guide set menu is closed and a main menu shown in FIG. 13 is displayed. As will be explained hereinafter, if in the state of FIG. 14 the program guide display key 32 is pressed, a program guide and broadcast video are displayed in 2-screens form. Meanwhile, if the program guide display key 32 is pressed when "1 SCREEN DISPLAY" is set, display is made with a program guide superimposed over a broadcast video.

Figure 15:
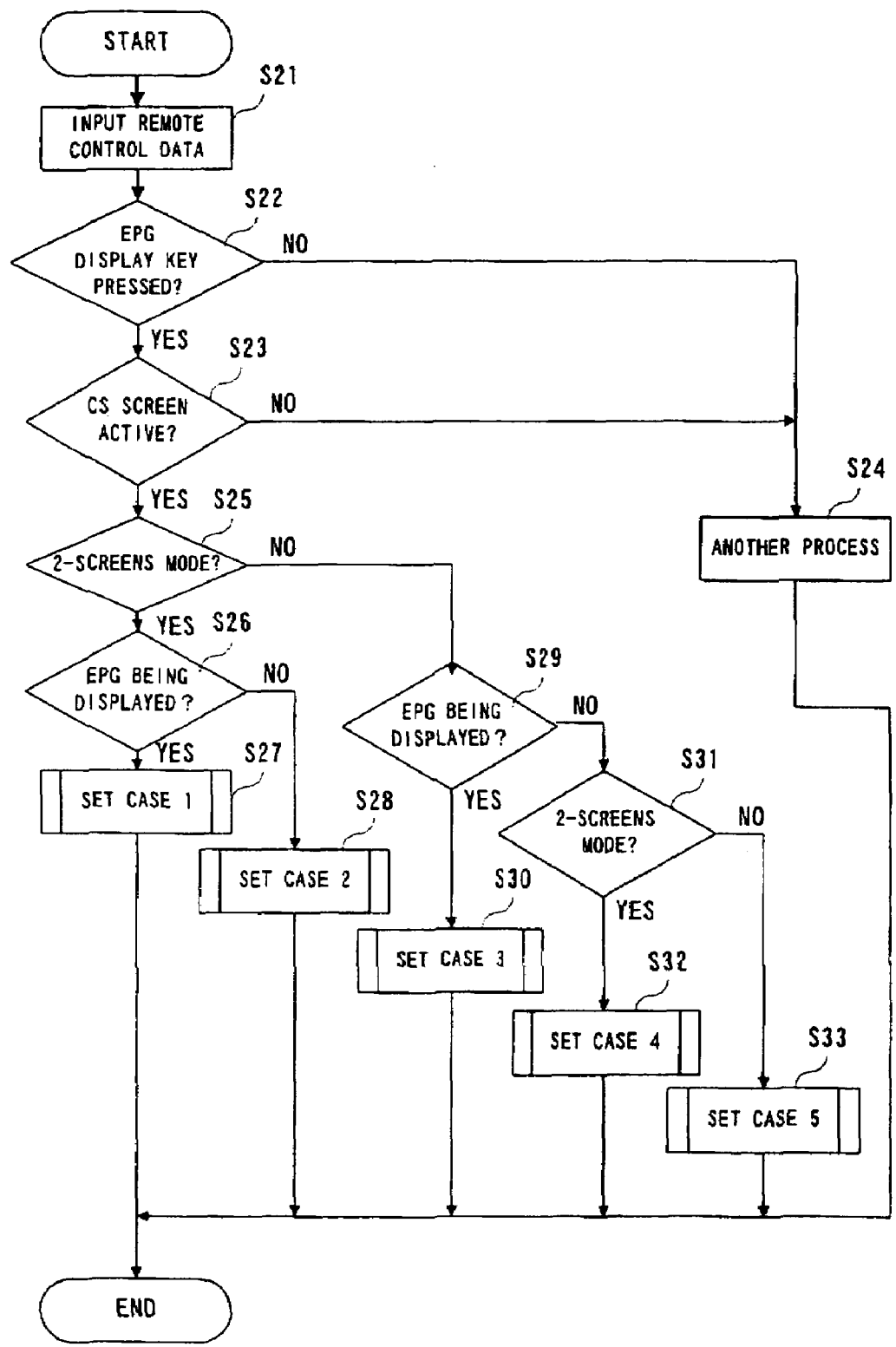
FIG. 15 is a flowchart showing an operation in the FIG. 7 embodiment.

Referring to FIG. 15, in the first step S21 the system control micro-computer 26 receives remote control data from the remote control transmitter 28. In the next step S22 the system control micro-computer 26 determines whether or not operated was the program guide display key 32 on the remote control transmitter 30 shown in FIG. 12. If "YES" is determined in this step S22, then in the next step S23 the system control micro-computer 26 determines whether a CS screen is inactive or not. That is, the system control micro-computer 26 receives CS control signal from the CS micro-computer 126 included in the CS receive section 12, and determines whether or not a CS television broadcast is presently being received by the CS receive section 12 and a video picture is displayed on the monitor 24 according to that television broadcast.

If "NO" is determined in either of the two steps, i.e. S22 or S23, the system control micro-computer 26 in step S24 carries out other processes (programs).

However, if "YES" is determined in both the steps S22 and S23, the system control micro-computer 26 in the succeeding step S25 determines based on a CS control signal given from the CS micro-computer 126 (FIG. 8) whether 2-screens display is effected on monitor 24 or not. If "YES" is determined in this step S25, the system control micro-computer 26 in the next step S26 determines based on the CS control signal whether a program guide (EPG) is already displayed on the monitor 24 or not.

If "YES" is determined in the step S26, "case 1" is set in the next step S27. In order to set "case 1", the system control micro-computer 26 controls the first selector 36 to deliver CS video data to the first video compression circuit 40, as shown in FIG. 16. At the same time, the second selector 38 is controlled to supply the other video data to the second video compression circuit 42. Furthermore, the system control micro-computer 26 supplies, as a first compression ratio signal, such a 50% control signal that the first video compression circuit 40 performs thinning-out on input video data down to ½, and such a 50% second compression ratio signal that the second video compression circuit 42 compress input video data down to ½.

At this time, the CS micro-computer 126 included in the CS receive section 12 outputs a window control signal so as not to send a CS window signal from the CS window signal generating circuit 128 (FIG. 8) to the CS video compositing circuit 125, in response to a CS control signal from the CS control micro-computer 26. Consequently, the CS video compositing circuit 125 outputs only CS broadcast video data through the AV recorder 124. Due to this, the first video compression circuit 40 is inputted by only the CS broadcast video data. The first video compression circuit 40 compresses the CS broadcast video data down to 50% and outputs a first compression video signal. On the other hand, the second video compression circuit 42 is inputted by the other video data, say terrestrial television broadcast video data. Accordingly, the second video compression circuit 42 compresses the other video data down to 50% and outputs a second compression video signal. The window signal generating circuit 46 (FIG. 7) outputs a window signal to divide left and right the monitor 24 screen into two, based on a window control signal sent from the system control micro-computer 26. Consequently, the video compositing circuit 44 composites the first compression video signal with the second compression video signal such that the first video signal from the first video compression circuit 40 is displayed on one of the two-divided screen (let half in the embodiment) and the second compression video signal from the second video compression circuit 42 is on the other (right half in the embodiment). In the case 1, therefore, a ½-compressed CS broadcast video is displayed on the left half of the monitor 24 screen and the other ½-compressed video signal is on the right half, as illustrated in the left end column in FIG. 16.

If "NO" is determined in the step S26, "case 2" is set in the next step S28. In order to set "case 2", the system control micro-computer 26 controls the first selector 36 to send CS video data to the first video compression circuit 40, as shown in FIG. 16. Also, the system control micro-computer 26 controls the second selector 38 to supply the other video data to the second video compression circuit 42. Further, the system control micro-computer 26 sends a 50% first compression ratio signal to the first video compression circuit 40, and a 50% second compression ratio signal to the second video compression circuit 42.

At this time, the CS micro-computer 126 included in the CS receive section 12 outputs a CS window control signal in response to a CS control signal given from the CS control micro-computer 26. Accordingly, the CS window signal generating circuit 128 generates a CS window signal in a predetermined range and deliver it to the CS video compositing circuit 125. Due to this, the CS video compositing circuit 125 outputs CS video data having a CS broadcast video data given from the AV decoder 124 superimposed thereon with the EPG data given from the EPG display circuit 127, as shown in the right end column in FIG. 16. This CS video data is inputted to the first video compression circuit 40. The first video compression circuit 40 compresses the CS video data superimposed with CS broadcast video data and EPG data down to ½, thus outputting a first compression video signal. On the other hand, the second video compression circuit 42 is inputted by the other video data, say terrestrial television broadcast video data. Accordingly, the second video compression circuit 42 compresses the other video data down to ½, outputting a second compression video signal. The window signal generating circuit 46 (FIG. 7) outputs a window signal to divide left and right the monitor 24 screen into two, based on a window control signal given from the system control micro-computer 26. Consequently, the video compositing circuit 44 composites the first compression video signal with the second compression video signal such that the first compression video signal given from the first video compression circuit 40 is displayed on one of two-divided screen portions (let half in the embodiment) while display and the second compression video signal given from the second video compression circuit 42 is on the other (right half in the embodiment). Therefore, in the case 2, a 50%-compressed video picture superimposed with CS broadcast and EPG videos is displayed on the left half of the monitor 24 screen and 50%-compressed another video signal is on the right half.

If "NO" is determined in the previous step S25, the system control micro-computer 26 in the next step S29 determines whether EPG is being displayed or not, similarly to the step S26. If "YES" is determined in this step S29, then in step S30 "case 3" is set. In order to set "case 3", the system control micro-computer 26 controls the second selector 38 to supply CS video data to the second video compression circuit 42. At this time, anything may be inputted to the first video compression circuit 40. Consequently, the first selector 36 is appropriately controlled. The first compression signal may be such a 50% control signal that the first video compression circuit 40 thins out input data down to ½, or a compression rate signal not to effect thinning out. The system control micro-computer 26 further supplies a 100% second compression rate signal not to compress input data in the second video compression circuit 42.

At this time, the CS receive section 12 outputs only CS broadcast video data, similarly to case 1. Due to this, the second video compression circuit 42 is inputted only by CS broadcast video data. The second video compression circuit 42 in this embodiment outputs the CS broadcast video data as a second compression video signal without compression. On the other hand, the first video compression circuit 40 is inputted by any of video data but nothing may be inputted to the first video compression circuit 40. The system control micro-computer 26 at this time does not output a window control signal. Consequently, the video compositing circuit 44 outputs only a second compression video signal (in this case, uncompressed CS broadcast video signal) to the monitor 24. Accordingly, in this case 3 CS broadcast video pictures are displayed entirely on the monitor 24, as shown in the left and column in FIG. 16.

If "NO" is determined in the previous step S29, then the system control micro-computer 26 in the next step S31 determines whether EPG setting is for 2 screens or not. This can be determined by detecting CS control signal given from the CS micro-computer 126, similarly to the step S25. If "YES" is determined in this step S31, "case 4" is set in step S32. In order to set "case 4", the system control micro-computer 26 controls the first selector 36 to supply CSEPG data as an input to the first video compression circuit 40. Also, the second selector 38 is controlled to supply CS video data to the second video compression circuit 42. Furthermore, the system control micro-computer 26 delivers to the first video compression circuit 40 such a 50% first compression rate signal that the first video compression circuit 40 thins out input video data down to ½. The system control micro-computer 26 also supplies to the second video compression circuit 42 such a 50% second compression rate signal that the second video compression circuit 42 compresses input video data down to ½.

At this time, the CS micro-computer 126 included in the CS receive section 12 does not output CS window control signal, responsive to a CS control signal given from the CS control micro-computer 26. Accordingly, the CS video compositing circuit 125 outputs, as CS video data, CS broadcast video data supplied from the AV decoder 124 as shown in the right end column in FIG. 16. This CS video data is inputted to the second video compression circuit 42. The second compression circuit 42 compresses the CS video data comprising only CS broadcast video data down to ½, thus outputting a second compression video signal. On the other hand, the CS micro-computer 126 delivers EPG display data to the EPG display circuit 127. Consequently, the EPG display circuit 127 outputs EPG data. This EPG is inputted to the first video compression circuit 40, and the first video compression circuit 40 compresses the EPG data down to ½ and outputs a first compression video signal. The window signal generating circuit 46 (FIG. 7) outputs a window signal to divide the monitor 24 screen left and right into two, based on the window control signal given from the system control micro-computer 26. Accordingly, the video compositing circuit 44 composites the first compression video signal with the second compression video signal such that the second compression video signal given from the second video compression circuit 42 is displayed on one of two-divided screen portions (left half in the embodiment) and the first compression video signal given from the first video compression circuit 40 is on the other (right half in the embodiment). Accordingly, in this case 4 EPG video pictures compressed by 50% are displayed on left half of the monitor 24 screen and CS broadcast video pictures compressed by 50% are on the right half.

As in this case 4, CS broadcast and EPG video pictures are displayed on different screen areas in the monitor 24. This achieves such display that the CS broadcast video picture be not prevented from viewing by EPG, similarly to the FIG. 2 embodiment.

If "NO" is determined in step S31, then "case 5" is set in the next step S33. In order to set "case 5", the system control micro-computer 26 controls the second selector 38 to supply CS video data to the second video compression circuit 42. At this time, anything may be inputted to the first video compression circuit 40. Accordingly, first selector 36 is appropriately controlled. The first compression rate signal may be such a 50% control signal that the first video compression circuit 40 thins out input video data down to ½, or a 100% compression rate signal not to effect thinning out. The system control micro-computer 26 further delivers to the second video compression circuit 42 a 100% second compression rate signal that the second video compression circuit 42 does not compress input video data.

At this time, the CS micro-computer 126 included in the CS receive section 12 outputs a CS window control signal, responsive to CS control signal given from the CS control micro-computer 26. Consequently, the CS window signal generating circuit 128 generates a CS window signal in a predetermined range and then supplies it to the CS video compositing circuit 125. Due to this, the CS video compositing circuit 125 outputs CS video data which is superimposed with CS broadcast video data given from the AV decoder 124 and EPG data given from the EPG display circuit 127 according to the CS window signal, as shown in the right end column in FIG. 16. This CS video data is inputted to the second video compression circuit 42. The second video compression circuit 42 outputs a second compression video signal without compressing the CS video data superimposed with the CS broadcast video data and EPG data. On the other hand, any of video data or nothing may be inputted to the first video compression circuit 40. The system control micro-computer 26 at this time does not output a window control signal. Consequently, the video compositing circuit 44 outputs onto a monitor 24 only a second compression video signal (in this case, uncompressed video signal superimposed with the CS broadcast and EPG video signals). Accordingly, in this case 5 CS broadcast video pictures are displayed entirely on the monitor 24 with EPG video pictures superimposed and displayed in a predetermined area thereof, as shown in the left end column in FIG. 16.

Incidentally, where the current state is in case 1 or case 5, if the 2-screens key 32*a* (FIG. 12) on the remote control transmitter 30 is operated, then the state changes as follows though a flowchart thereof will not be especially shown.

First, where in case 1 2-screens display is being made, if the 2-screens key 32*a* is pressed, case 3 is entered thus providing full-screen display. However, no EPG display is made at this time.

Where in case 2 2-screens display is being made, if the 2-screens key 32*a* is depressed, case 5 is entered thus providing full-screen display. In this case, however, an EPG is displayed by superimposition over a CS broadcast video.

Where in case 3 1-screen display is being made, if the 2-screens key 32*a* is pressed, case 1 is entered thus providing 2-screens display. However, no EPG display is made at this time.

Where in case 4 2-screens display is being made, if the 2-screens key 32*a* is pressed, case 2 is entered thus providing full-screen display. In this case, however, an EPG is displayed by forcible superimposition over a CS broadcast video because of outputting EPG data from the CS receive section 12.

Where in case 5 full-screen display is being made, if the 2-screens key 32*a* is pressed, case 2 is entered thus providing 2-screens display. However, an EPG is displayed by superimposition over a CS broadcast video at this time.

Incidentally, in the case 1 or case 2 of the above embodiment, CS broadcast video pictures are displayed on the left half of the monitor 24. This however is not determined in a one-meaning fashion. The position in display of the CS broadcast videos can be replaced with a position of other video pictures by operating a switching key (not shown) included in the remote control transmitter 30.

Also, in the above embodiments the television receiver was exemplified which can receive CS broadcast as digital television broadcast. However, the digital television broadcast may include, besides CS broadcast, arbitrary digital television broadcast such as terrestrial digital television broadcast, BS digital television broadcast, CATV digital television broadcast and so on. It is needless to say that the receive section can be arbitrarily modified depending upon a kind of digital television broadcast.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital television receiver, comprising:
a receiver for receiving a digital television broadcast signal;

a first extractor for extracting broadcast video data contained in a digital television broadcast signal received by said receiver;
a second extractor for extracting additional information data contained in the digital television broadcast signal received by said receiver;
an additional information video data outputter for outputting additional information video data based on the additional information data;
a first video compositor for compositing the broadcast video data and the additional information video data according to a first window signal and outputting digital video data;
a first selector for receiving at least the digital video data and the additional information video data and outputting first video data;
a second selector for receiving at least the digital video data and the additional information video data and outputting second video data;
a first video compressor for compressing the first video data according to a first compression ratio and outputting a first video data compression video signal;
a second video compressor for compressing the second video data according to a second compression ratio and outputting a second video data compression video signal;
a second video compositor for compositing the first video data compression video signal and second video data compression video signal according to a second window signal; and
a monitor for displaying video pictures based upon an output of said second video compositor.

2. A digital television receiver according to claim 1, further comprising an inputter to be operated by a user and a window changer to change at least one of the first window signal and the second window signal depending upon operation of said inputter.

3. A digital television receiver according to claim 2, wherein said inputter includes a 2-screens setter to set at least video display on said monitor to 2-screens display, and an additional information display setter to display the additional information, wherein said window signal changer changes at least one of the first window signal and the second window signal depending upon at least one of operation of said 2-screens setter and said additional information display setter.

4. A digital television receiver according to claim 2, further comprising a compression ratio controller to control the first compression ratio and the second compression ratio depending upon operation of said inputter.

5. A digital television receiver according to claim 4, wherein said inputter includes a 2-screens setter to set at least video display on said monitor to 2-screens display, and an additional information display setter to set the additional information, wherein said compression ratio controller sets the first compression ratio and the second compression ratio depending upon at least one of operation of said 2-screens setter and said additional information display setter.

6. A digital television receiver according to any of claims 1 to 5, further comprising a video data provider to provide another of video data to said first selector and said second selector.

7. A digital television receiver, comprising:
a receiver for receiving a digital television broadcast signal;
a first extractor for extracting broadcast video data contained in the digital television broadcast signal received by said receiver;
a second extractor for extracting additional information data contained in the digital television broadcast signal received by said receiver;
an additional information video data outputter for outputting additional information video data based on the additional information data;
a first selector for receiving at least the broadcast video data and the additional information video data so as to output first video data;
a second selector for receiving at least the broadcast video data and the additional information video data so as to output second video data;
a first video compressor for compressing the first video data so as to output a first compression video signal;
a second video compressor for compressing the second video data so as to output a second compression video signal;
a video compositor for compositing the first compression video signal and the second compression video signal with each other; and
a monitor for displaying video pictures based upon an output of said video compositor, wherein
each of the first video data and the second video data is video data sampled by a clock rate corresponding to a first frequency,
said first video compressor includes a first memory controller which writes the first video data into a first memory by a clock rate corresponding to a second frequency which is lower than the first frequency and reads the first video data from said first memory by a clock rate corresponding to the first frequency, and a first D/A converter which subjects the first video data read out by said first memory controller to a D/A conversion process by a clock rate corresponding to the first frequency so as to output the first compression video signal, and
said second video compressor includes a second memory controller which writes the second video data into a second memory by a clock rate corresponding to the first frequency and reads the second video data from said second memory by a clock rate corresponding to a third frequency which is higher than the first frequency, and a second D/A converter which subjects the second video data read out by said second memory controller to a D/A conversion process by a clock rate corresponding to the third frequency so as to output the second compression video signal.

8. A digital television receiver according to claim 7, wherein the first video data is the broadcast video data, and the second video data is the additional information video data.

9. A digital television receiver according to claim 8, wherein the additional information video data is program guide data to display a program guide expressed by a text.

10. A digital television receiver according to claim 7, wherein the second frequency is half the first frequency, and the third frequency is twice the first frequency.

11. A digital television receiver according to claim 7, further comprising a video data provider to provide other video data to said first selector and said second selector.

* * * * *